United States Patent
Donawa et al.

(10) Patent No.: US 7,421,540 B2
(45) Date of Patent: Sep. 2, 2008

(54) METHOD, APPARATUS, AND PROGRAM TO EFFICIENTLY CALCULATE CACHE PREFETCHING PATTERNS FOR LOOPS

(75) Inventors: Christopher Michael Donawa, Burnaby (CA); Allan Henry Kielstra, Ajax (CA)

(73) Assignee: International Business Machines Corporation, Armonk, NY (US)

( * ) Notice: Subject to any disclaimer, the term of this patent is extended or adjusted under 35 U.S.C. 154(b) by 386 days.

(21) Appl. No.: 11/120,915

(22) Filed: May 3, 2005

(65) Prior Publication Data

US 2006/0253656 A1    Nov. 9, 2006

(51) Int. Cl.
 *G06F 12/00* (2006.01)
(52) U.S. Cl. .................. 711/137; 711/217; 712/207
(58) Field of Classification Search .............. 711/137; 717/161
See application file for complete search history.

(56) References Cited

U.S. PATENT DOCUMENTS

| | | | |
|---|---|---|---|
| 5,704,053 A | 12/1997 | Santhanam | 284/383 |
| 5,805,863 A | 9/1998 | Chang | 395/500 |
| 5,854,934 A * | 12/1998 | Hsu et al. | 717/161 |
| 5,933,643 A | 8/1999 | Holler | 395/709 |
| 6,321,330 B1 * | 11/2001 | Doshi et al. | 712/241 |
| 6,453,389 B1 * | 9/2002 | Weinberger et al. | 711/137 |
| 6,546,550 B1 | 4/2003 | Ogata et al. | 717/148 |
| 6,634,024 B2 | 10/2003 | Tirumalai et al. | 717/161 |
| 6,701,334 B1 * | 3/2004 | Ye et al. | 707/206 |
| 6,961,930 B1 * | 11/2005 | Waldspurger et al. | 717/141 |
| 2003/0088863 A1 | 5/2003 | Tirumalai et al. | 717/158 |
| 2003/0088864 A1 * | 5/2003 | Tirumalai et al. | 717/160 |
| 2003/0126591 A1 * | 7/2003 | Wu et al. | 717/158 |
| 2003/0145314 A1 | 7/2003 | Nguyen et al. | 717/158 |
| 2003/0196046 A1 * | 10/2003 | Abdallah et al. | 711/137 |
| 2003/0204840 A1 | 10/2003 | Wu | 717/158 |
| 2004/0031026 A1 | 2/2004 | Srinivasan | 717/161 |
| 2004/0117557 A1 * | 6/2004 | Paulraj et al. | 717/137 |
| 2004/0194077 A1 * | 9/2004 | Bharadwaj et al. | 717/158 |
| 2004/0243981 A1 * | 12/2004 | Luk et al. | 717/130 |

OTHER PUBLICATIONS

Inagaki et al., "Stride Prefetching by Dynamically Inspecting Objects", SIGPLAN Not. (USA) vol. 38, No. 5, May 2003, abstract.
Van den berg J., et al., "The Loop Compiler for Java and JML", Tools and Algorithms for the Construction and Analysis of Systems, Apr. 2-6, 2001, vol. 2031; p. 229-312.

* cited by examiner

*Primary Examiner*—Pierre Michel Bataille
*Assistant Examiner*—Hal Schnee
(74) *Attorney, Agent, or Firm*—Duke W. Yee; Matthew Talpis; Gerald H. Glanzman

(57) ABSTRACT

A mechanism is provided that identifies instructions that access storage and may be candidates for cache prefetching. The mechanism augments these instructions so that any given instance of the instruction operates in one of four modes, namely normal, unexecuted, data gathering, and validation. In the normal mode, the instruction merely performs the function specified in the software runtime environment. An instruction in unexecuted mode, upon the next execution, is placed in data gathering mode. When an instruction in the data gathering mode is encountered, the mechanism of the present invention collects data to discover potential fixed storage access patterns. When an instruction is in validation mode, the mechanism of the present invention validates the presumed fixed storage access patterns.

18 Claims, 7 Drawing Sheets

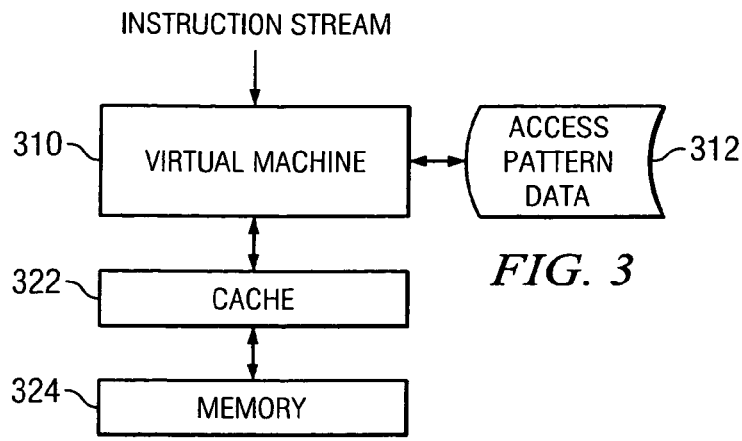

```
Struct data_gathering_struct {
    #define N 11
    ThreadId         thread_id;
    FieldId          field_id_of_original_instr;
    void *           pointer_to_getfield_instruction;
    char *           last_address_referenced;
    long             timestamp;
    unsigned char    differences [N];
    char             diff_count;
}
```

```
Struct data_verification_struct {
    #define TOTAL_SAMPLE_LIMIT 50
    ThreadId         thread_id;
    FieldId          field_id_of_original_instr;
    Void *           pointer_to_getfield_instruction;
    Char *           last_address_referenced;
    Long             timestamp;
    Unsigned char    total_sample_count;
    Unsigned char    cache_hit_count;
    Unsigned char    anticipated_cache_stride_count;
    Unsigned char    expected_cache_stride;
}
```

FIG. 4B

METHOD, APPARATUS, AND PROGRAM TO EFFICIENTLY CALCULATE CACHE PREFETCHING PATTERNS FOR LOOPS

BACKGROUND OF THE INVENTION

1. Technical Field

The present invention relates to data processing and, in particular, to cache prefetching in data processing systems. Still more particularly, the present invention provides a method, apparatus, and program to efficiently calculate cache prefetching patterns for loops.

2. Description of Related Art

Many current software runtime environments use cache prefetching. Prefetching works as follows: upon detecting a sequential memory access pattern in an executing program the software environment starts to prefetch cache lines from main memory to L1/L2 caches. The purpose is to make the data available to the executing program in the low latency cache when the data is actually accessed later, thereby reducing the average memory access time.

An example of a software runtime environment is a Java™ virtual machine (JVM). There are loops in the Java™ programming language, for example, that iterate over a data structure in such a way that access to storage follows a predictable pattern. If a JVM had knowledge of such a pattern, it could insert cache prefetch instructions into the code stream or determine unroll factors that would speed up execution of the loop.

Thus, while interpreting or just-in-time (JIT) compiling bytecode, the JVM may look for access patterns that are regular. The JVM may then leave a record of such patterns, such as expected stride, for exploitation by a JIT compiler and may possibly insert prefetch instructions or determine loop unrolling factors.

Stride is a distance between successive memory accesses. Current methods for determining stride using well-known static compiler techniques to evaluate variables are used to index a loop. To augment this analysis, the JVM compiler may profile a given routine and collect data. This requires either building a bytecode interpreter before generating binary code, generating bytecode to perform the profiling, or generating a binary version with profiling hooks and then later recompiling the routine utilizing the profiling information. All of these approaches pay a high processing overhead. Additionally, if data structures other than the profile information are being manipulated, such as B-trees for example, then analysis becomes even more difficult.

SUMMARY OF THE INVENTION

The present invention recognizes the disadvantages of the prior art and provides a mechanism that identifies instructions that access storage and may be candidates for cache prefetching. The mechanism augments these instructions so that any given instance of the instruction operates in one of four modes, namely normal, unexecuted, data gathering, and validation. In the normal mode, the instruction merely performs the function specified in the software runtime environment. An instruction in unexecuted mode, upon the next execution, is placed in data gathering mode. When an instruction in the data gathering mode is encountered, the mechanism of the present invention collects data to discover potential fixed storage access patterns. When an instruction is in validation mode, the mechanism of the present invention validates the presumed fixed storage access patterns.

In a preferred embodiment, this invention provides for a method, in a data processing system, for determining cache prefetching patterns, the method comprising the steps of: identifying an instruction as a candidate for cache prefetching; placing the instruction in data gathering mode; upon executing the instruction in data gathering mode, recording, in an array of address differences, a difference between a current address being referenced and a last address being referenced; and responsive to a number of address differences being recorded in the array of address differences exceeding a threshold, determining an expected cache stride value based on the array of address differences.

In one variation, placing the instruction in data gathering mode includes: provisioning a data gathering structure for the instruction, wherein array of address differences is stored in the data gathering structure. The method may further comprise responsive to a class containing the instruction being unloaded, recovering the data gathering instruction. Also, the method may further comprise responsive to identifying an instruction as a candidate for cache prefetching, placing the instruction in unexecuted mode. The step of placing the instruction in data gathering mode may be performed upon executing the instruction in unexecuted mode. The step of provisioning a data gathering structure for the instruction may also be performed upon executing the instruction in unexecuted mode.

In another variation, the expected cache stride value is determined using the following equation:

$$B = \frac{\left(\left(\sum (\text{differences}[i-1])\right) * \sum (i^2)\right) - (N*(N+1)/2) * \sum (i*\text{differences}[i-1])}{((N*\sum(i^2)) - (N*(N+1)/2)^2)},$$

wherein B represents an expected cache stride in terms of cache lines and wherein all of the sums are for i=1 to N, wherein N is a number of address differences in the array of address differences.

In a further variation, the method may further comprise: responsive to the number of address differences being recorded in the array of address differences exceeding the threshold, validating the expected cache stride value. Validating the expected cache stride value may include: placing the instruction in a validation mode; upon executing the instruction in validation mode, performing the following steps: incrementing a total sample count; incrementing a cache hit count if a current address being referenced is within a same cache line as a last address being referenced; incrementing an anticipated cache stride count if a current address being referenced is within the expected cache stride of a last address being referenced; determining whether a sufficient number of samples have been considered based on the total sample count; and responsive to a sufficient number of samples being considered, determining whether a predetermined percentage of accesses are within the expected cache stride based on the total sample count, the cache hit count, and the anticipated cache stride count. The method may also comprise the step of, responsive to the expected cache stride value being valid, providing the array of address differences to a compiler. The compiler may be a just-in-time compiler.

In a further variation, the method comprises: responsive to the instruction being just-in-time compiled, placing the instruction in normal mode.

In another variation, the method further comprises: responsive to the number of address differences being recorded in the array of address differences exceeding the threshold, determining a standard deviation for the address differences in the array of address differences; and responsive to the standard deviation exceeding a threshold, placing the instruction in normal mode.

According to a further variation, the method is performed within a virtual machine.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram illustrating a software runtime environment in accordance with a preferred embodiment of the present invention;

FIGS. 4A & 4B illustrate an example data gathering structure for a load instruction in accordance with a preferred embodiment of the present invention.

DETAILED DESCRIPTION OF THE PREFERRED EMBODIMENT

Figure 1:
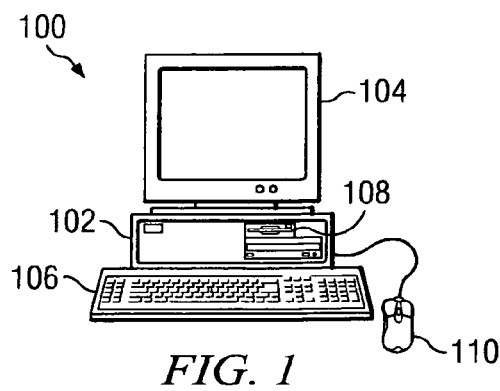
FIG. 1 is a pictorial representation of a data processing system in which the present invention may be implemented in accordance with a preferred embodiment of the present invention.
Figure 2:
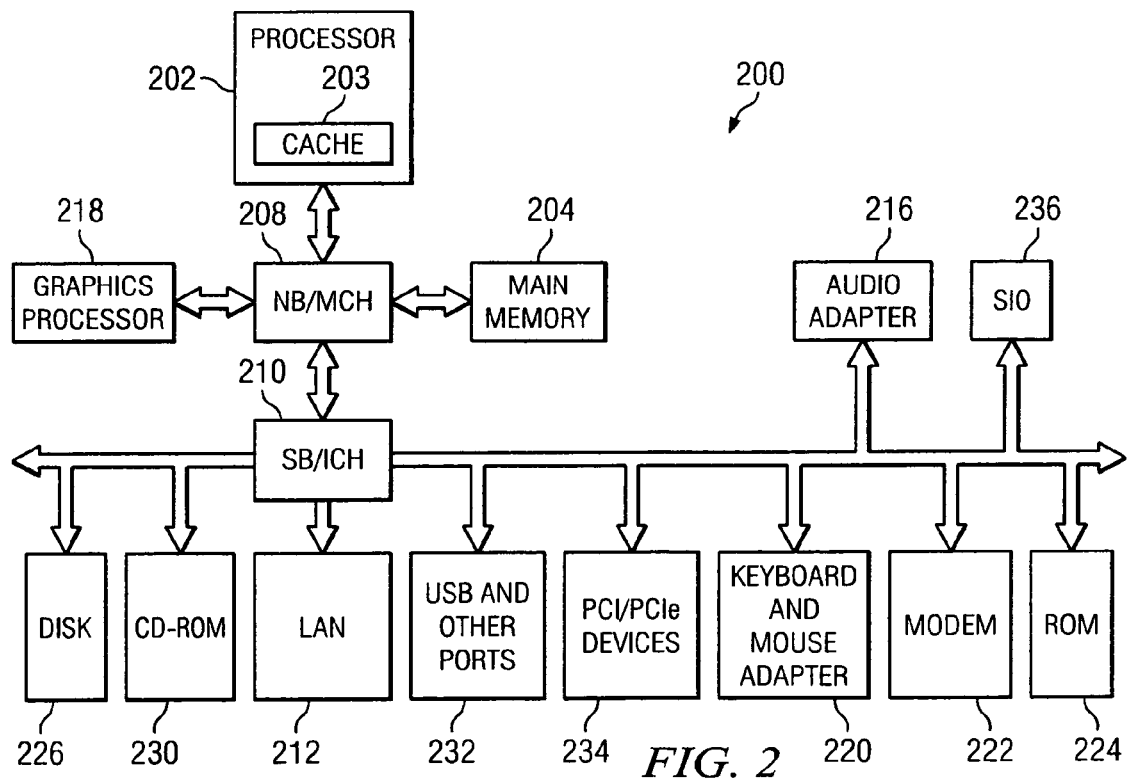
FIG. 2 is a block diagram of a data processing system in which the present invention may be implemented.

The present invention provides a method, apparatus and computer program product for efficiently calculating cache prefetching patterns for loops. The data processing device may be a single-processor computing device, a multiprocessing data processing system, or a virtual processor environment in which multiple processors and multiple layers of software may be utilized to perform various aspects of the present invention. Therefore, the following FIGS. 1 and 2 are provided as exemplary diagrams of data processing environments in which the present invention may be implemented. It should be appreciated that FIGS. 1 and 2 are only exemplary and are not intended to assert or imply any limitation with regard to the environments in which the present invention may be implemented. Many modifications to the depicted environments may be made without departing from the spirit and scope of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like.

Computer 100 can be implemented using any suitable computer, such as an IBM eServer™ computer or IntelliStation® computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. In the depicted example, data processing system 200 employs a hub architecture including a north bridge and memory controller hub (MCH) 208 and a south bridge and input/output (I/O) controller hub (ICH) 210. Processor 202, main memory 204, and graphics processor 218 are connected to MCH 208. Graphics processor 218 may be connected to the MCH through an accelerated graphics port (AGP), for example.

In the depicted example, local area network (LAN) adapter 212, audio adapter 216, keyboard and mouse adapter 220, modem 222, read only memory (ROM) 224, hard disk drive (HDD) 226, CD-ROM driver 230, universal serial bus (USB) ports and other communications ports 232, and PCI/PCIe devices 234 may be connected to ICH 210. PCI/PCIe devices may include, for example, Ethernet adapters, add-in cards, PC cards for notebook computers, etc. PCI uses a cardbus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be connected to ICH 210.

An operating system runs on processor 202 and is used to coordinate and provide control of various components within data processing system 200 in FIG. 2. The operating system may be a commercially available operating system such as Windows XP™, which is available from Microsoft Corporation. An object oriented programming system, such as Java™ programming system, may run in conjunction with the operating system and provides calls to the operating system from Java™ programs or applications executing on data processing system 200. "JAVA" is a trademark of Sun Microsystems, Inc. Instructions for the operating system, the object-oriented programming system, and applications or programs are located on storage devices, such as hard disk drive 226, and may be loaded into main memory 204 for execution by processor 202. The processes of the present invention are performed by processor 202 using computer implemented instructions, which may be located in a memory such as, for example, main memory 204, memory 224, or in one or more peripheral devices 226 and 230.

Processor 202 includes a cache 203, which may be, for example, an L1 or L2 cache. Many current software runtime environments use data cache prefetching where, upon detecting sequential memory access pattern in an executing program, the software environment starts to prefetch cache lines from main memory 204 to caches 203. The purpose is to make the data available to the executing program in the low latency cache when the data is actually accessed later, thereby reducing the average memory access time.

The present invention provides a mechanism that identifies instructions that access storage and may be candidates for cache prefetching. The mechanism of the present invention provides a much cheaper (faster) and possibly more accurate method to obtain stride patterns for use by a just-in-time (JIT) compiler when generating binary code. Because the mechanism records the relationship of actual memory access patterns regardless of data structure, the mechanism of the present invention may be beneficial to any type of data structure. The mechanism of the present invention focuses on hardware architectures containing processor-specific data caches, although multiprocessors sharing caches can possibly benefit as well.

Those of ordinary skill in the art will appreciate that the hardware in FIG. 2 may vary depending on the implementation. Other internal hardware or peripheral devices, such as flash memory, equivalent non-volatile memory, or optical disk drives and the like, may be used in addition to or in place of the hardware depicted in FIG. 2. Also, the processes of the present invention may be applied to a multiprocessor data processing system.

For example, data processing system 200 may be a personal digital assistant (PDA), which is configured with flash memory to provide non-volatile memory for storing operating system files and/or user-generated data. The depicted example in FIG. 2 and above-described examples are not meant to imply architectural limitations. For example, data processing system 200 also may be a tablet computer, laptop computer, or telephone device in addition to taking the form of a PDA.

FIG. 3 is a block diagram illustrating a software runtime environment in accordance with a preferred embodiment of the present invention. Virtual machine 310 receives an instruction stream from a program to be executed. Virtual machine 310 may be, for example, a Java™ virtual machine and the instruction stream may represent one or more methods executing as part of one or more classes, which execute in one or more threads. In an exemplary embodiment of the present invention, virtual machine 310 includes a JIT compiler. However, the present invention is not intended to be limited to the Java™ programming system.

Instructions within the instruction stream may include load instructions that access memory 324. In the Java™ programming language, load instructions may include, for example, getfield instructions, aaload field instructions, and getstatic instructions to load values from fields of objects, arrays, and global objects. Upon detecting a sequential memory access pattern, virtual machine 310 may start to prefetch cache lines from main memory 324 to caches 322. The purpose is to make the data available to the executing program in the low latency cache when the data is actually accessed later, thereby reducing the average memory access time.

Virtual machine 310 augments load instructions such that any instance of a load instruction operates in one of four modes, namely "normal," "unexecuted," "data gathering," and "validation." In the normal mode, the instruction merely performs the function specified in the software runtime environment. An instruction in unexecuted mode, upon the next execution, is placed in data gathering mode. When an instruction in the data gathering mode is encountered, virtual machine 310 collects access pattern data 312 to discover potential fixed storage access patterns. When an instruction is in validation mode, virtual machine 310 validates the presumed fixed storage access patterns. In one exemplary embodiment of the present invention, virtual machine 310 distinguishes between modes by using a separate op-code for each type of load instruction operating in anything but the normal mode. For example, virtual machine 310 may provide a getfield_gather instruction in addition to the previously existing getfield instruction.

Certain data is associated with a load instruction in the data gathering mode. The data gathering structure may include, for example, a thread identifier, an indication of the last address referenced, an array of some number of differences between addresses of the successive accesses (differences array), and a count of the number of such data gathered may be recorded in a data gathering structure. During data gathering, virtual machine 310 may collect a predetermined number of samples, such as 11 for example. In one exemplary embodiment, virtual machine 310 may associate a given load instruction with a particular set of data by re-using the field reference of the original instruction to indicate the location of the associated data. Also, virtual machine 310 may allocate a fixed array of records and assume that at any given time a small number of actual load instructions are operating in data gathering mode.

FIG. 4A illustrates an example data gathering structure for a load instruction in accordance with a preferred embodiment of the present invention. In the example shown in FIG. 4A, the load instruction is a getfield instruction, although similar data gathering structures may also be defined for other known load instructions within a software programming language.

Certain data is associated with a load instruction operating in the validation mode. The validation structure may include, for example, the presumed value of the difference in addresses in successive executions of the instruction, an indication of the last address referenced by the instruction for each thread, a count of the number of times a successive access was within a single cache line of the predicted value, and a count of the number of times a successive access was not within a single cache line of the predicted value. The expectation is that load instructions will rarely operate in validation mode. Therefore, it is likely that a small number of validation structures will be allocated.

FIG. 4B illustrates an example data validation structure for a load instruction in accordance with a preferred embodiment of the present invention. In the example shown in FIG. 4B, the load instruction is a getfield instruction, although similar data validation structures may also be defined for other known load instructions within a software programming language.

FIGS. 5A-5E are flowcharts illustrating operation of a virtual machine for determining cache prefetching patterns for loops in accordance with a preferred embodiment of the present invention. More particularly, with reference to FIG. 5A, operation begins and loads the method of instructions (block 501). The virtual machine then determines which load instructions are in loops (block 502). The load instructions in loops may be determined by identifying load instructions that appear between a label and a backward branch to that label. These load instructions are initialized to the unexecuted mode (block 503). In an exemplary embodiment, instructions may be placed in a mode by replacing op-codes as discussed above.

A determination is made as to whether an exit condition exists (block 504). An exit condition may exist, for example when the virtual machine shuts down. If an exit condition exists, operation ends. Otherwise, a determination is made as to whether a load instruction in unexecuted mode is to be executed (block 505). If a load instruction in unexecuted mode is not encountered, a determination is made as to whether a load instruction in data gathering mode is to be executed (block 506). If a load instruction in data gathering mode is not encountered, a determination is made as to whether a load instruction in validation mode is to be executed (block 507). If a load instruction in validation mode is not encountered, operation returns to block 504 to determine whether an exit condition exists. Operation continues in this loop, executing normal instructions, including load instructions in normal mode, until an exit condition exists or a non-normal load instruction is encountered.

Figure 5A:
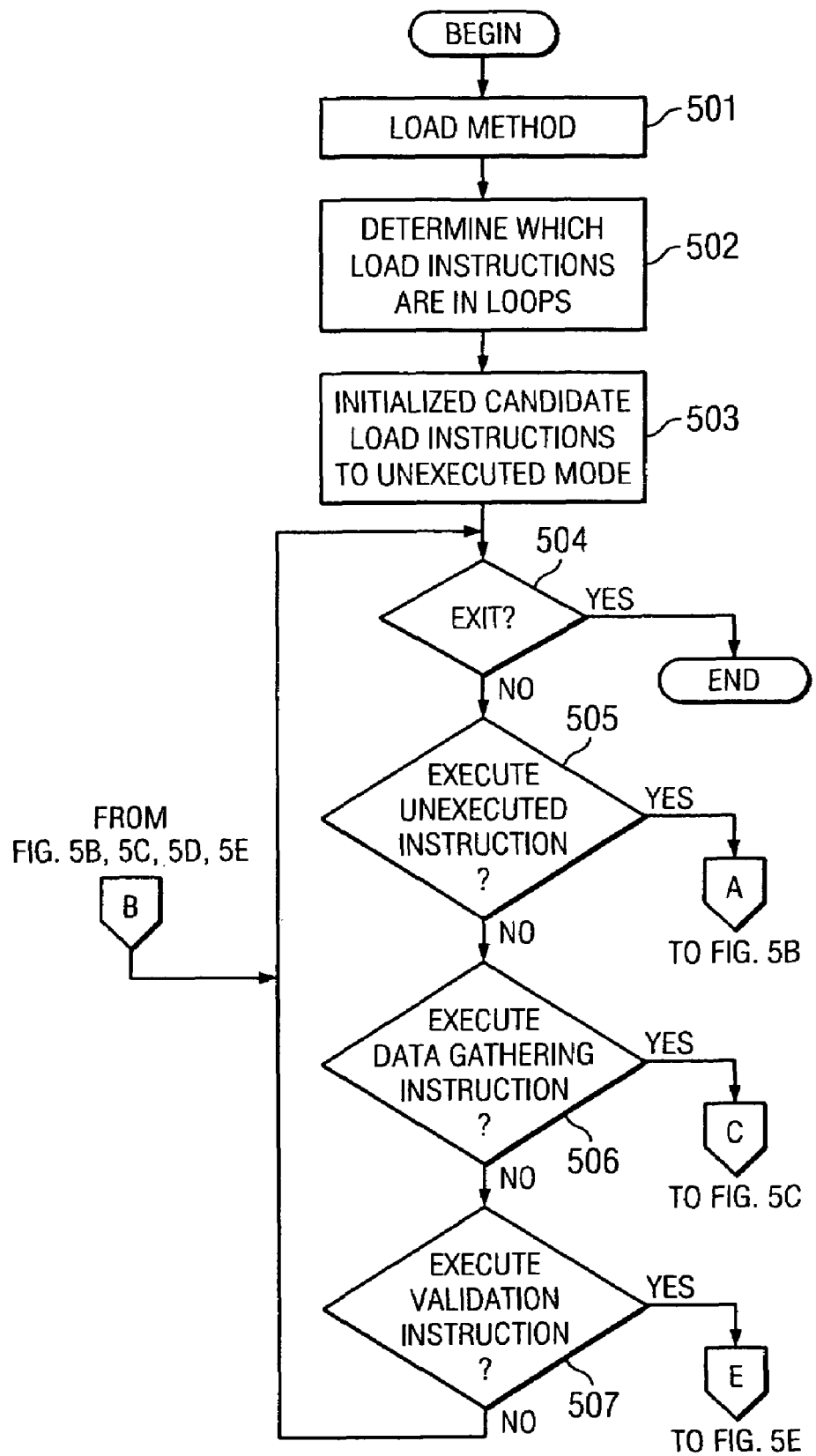
FIGS. 5A-5E are flowcharts illustrating operation of a virtual machine for determining cache prefetching patterns for loops in accordance with a preferred embodiment of the present invention.
Figure 5B:
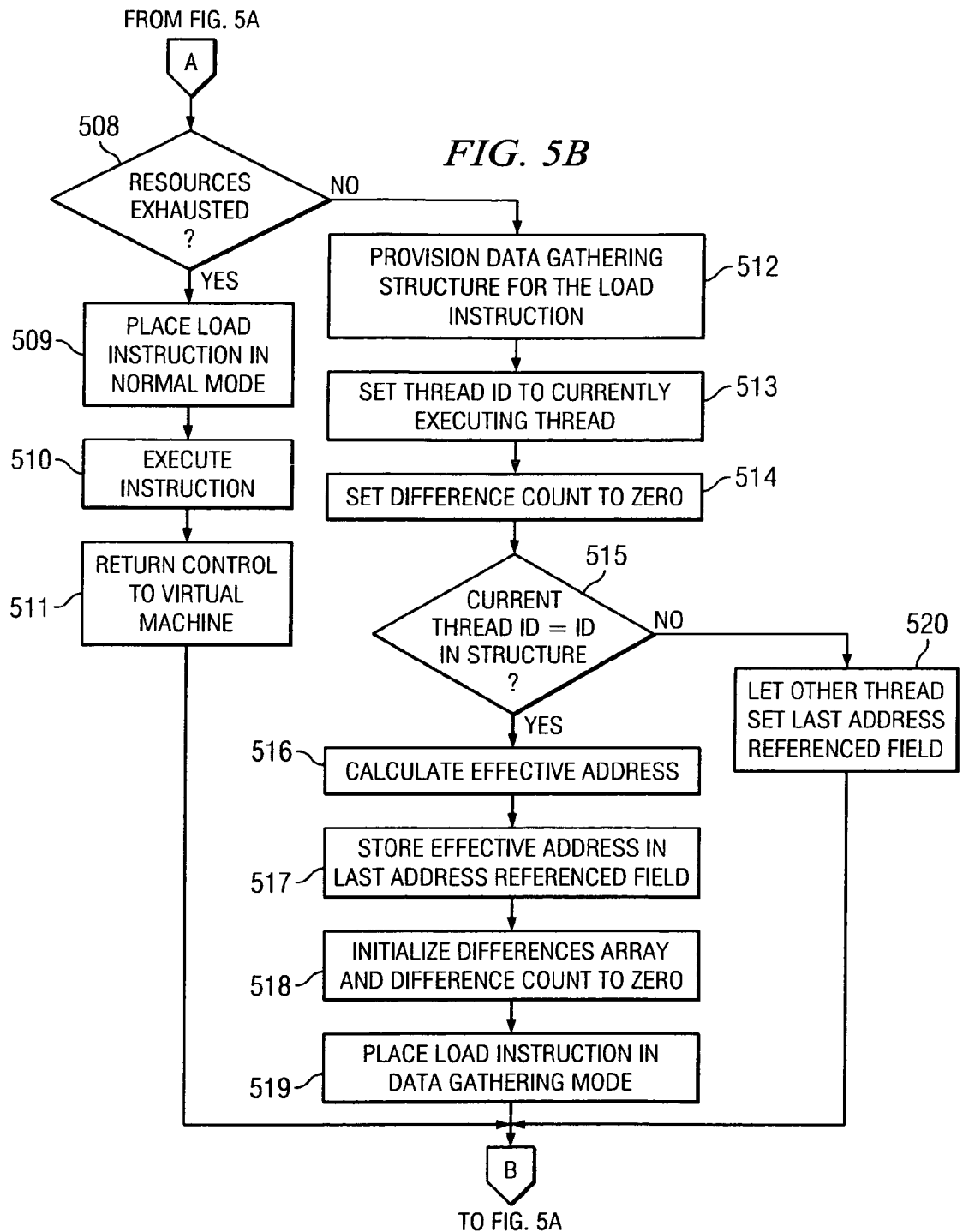

If a load instruction in unexecuted mode is encountered in block 505, operation proceeds to block 508 in FIG. 5B where a determination is made as to whether resources are exhausted. If resources are exhausted, the mechanism places the load instruction in normal mode (block 509), executes the instruction (block 510), and returns control to the virtual machine (block 511). Thereafter, operation returns to block 504 in FIG. 5A to determine whether an exit condition exists.

If resources are not exhausted in block 508, the virtual machine provisions a data gathering structure for the load instruction (block 512). The virtual machine then sets the thread identification (ID) to the currently executing thread (block 513) and sets the difference count to zero (block 514). The possibility of two threads executing a load instruction in this mode is not high. Furthermore, the danger of two threads executing these initializations simultaneously is inconsequential. It is assumed that writing this field is atomic (4-byte writes are typically atomic).

Next, a determination is made as to whether the current ID and the thread ID saved in the data gathering structure are the same (block 515). If the IDs are the same, then the effective address of the data to be loaded is calculated (block 516) and stored in the last address referenced field of the data gathering structure (block 517). Then, the virtual machine initializes the differences array and initializes the difference count to zero (block 518). The virtual machine also places the load instruction in data gathering mode (block 519) and operation returns to block 504 in FIG. 5A to determine whether an exit condition exists.

If the thread ID is not the same as the thread ID stored in the data gathering structure in block 515, then there was a race condition with another thread. In this case, the virtual machine lets the other thread set the last address referenced field (block 520) and operation returns to block 504 in FIG. 5A to determine whether an exit condition exists.

Figure 5C:
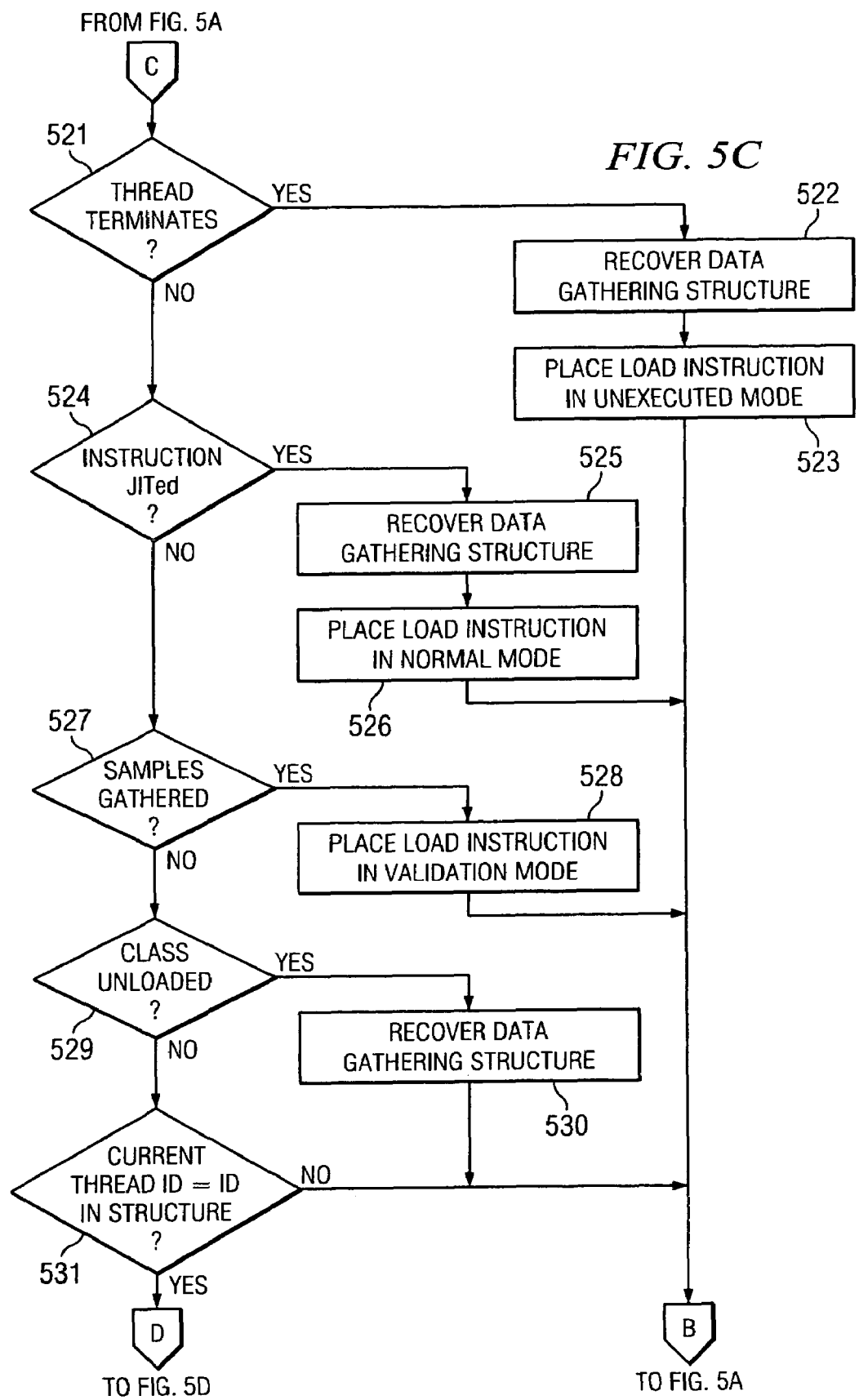

If a load instruction in data gathering mode is encountered in block 506, operation proceeds to block 521 in FIG. 5C where a determination is made as to whether the thread terminates. If the thread associated with the instruction terminates, the data gathering structure is recovered from memory (block 522) and the instruction is placed into unexecuted mode (block 523). Thereafter, operation returns to block 504 in FIG. 5A to determine whether an exit condition exists.

If the thread does not terminate in block 521, a determination is made as to whether the instruction is JIT compiled (block 524). If the instruction is JITed, the data gathering structure is recovered (block 525) and the instruction is placed in normal mode (block 526). No information is forwarded to the JIT compiler. Then, operation returns to block 504 in FIG. 5A to determine whether an exit condition exists.

If the instruction is not JITed in block 524, a determination is made as to whether a sufficient number of samples have been gathered (block 527). In this case, the instruction is placed in validation mode (block 528) and operation returns to block 504 in FIG. 5A to determine whether an exit condition exists.

If a sufficient number of samples have not yet been gathered in block 527, a determination is made as to whether the class containing the method containing the load instruction is unloaded by the virtual machine (block 529). In this case, the data gathering structure is recovered (block 530) and operation returns to block 504 in FIG. 5A to determine whether an exit condition exists.

If the class is not unloaded in block 529, a determination is made as to whether the thread ID of the data gathering structure matches the currently executing thread (block 531). If the thread ID of the structure does not match the current thread, no additional processing occurs and operation returns to block 504 in FIG. 5A to determine whether an exit condition exists. By limiting data gathering to a particular thread, a particular processor's data cache may be exploited.

Figure 5D:
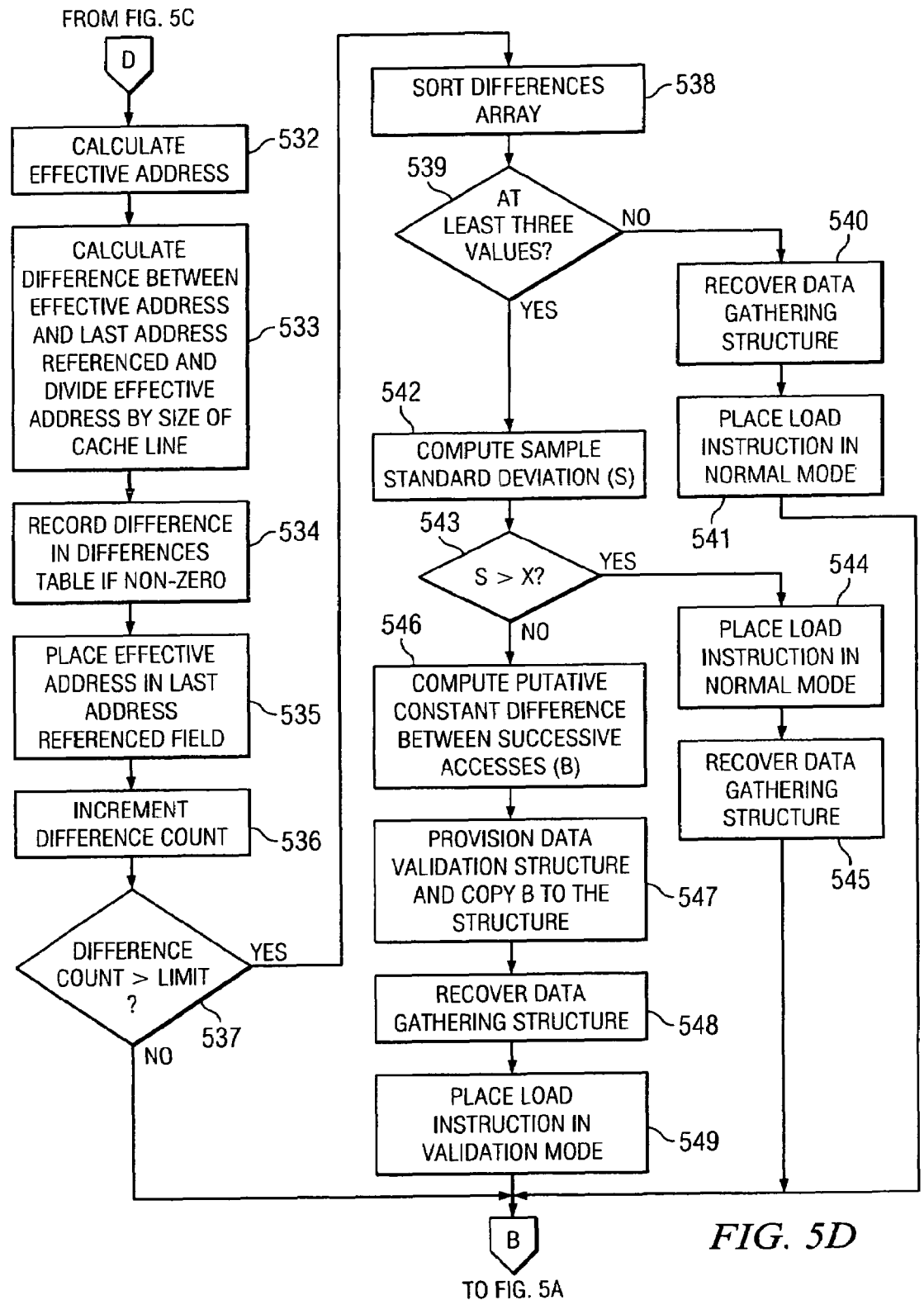

If the current thread ID matches the ID in the data gathering structure in block 531, operation proceeds to block 532 in FIG. 5D where the effective address of the data to be loaded is calculated. The difference between the effective address and the last address referenced field is calculated and the difference is divided by the size of the cache line (block 533). If the cache line size is a power of two, and it usually is, division can be performed simply by masking off the appropriate bits of the address and shifting when performing the calculation. If the result is greater than or equal to $256(2^8-1)$, then it is set to this value.

Then, the difference result is recorded in the differences array (block 534) unless the result is zero. Thereafter, the effective address is placed in the last address referenced field (block 535). The difference count field is incremented (block 536). A determination is made as to whether the difference count is greater than a predetermined limit (block 537). The difference count is used to track how many samples have been taken. This limit is tunable. If the difference count does not exceed the limit, then no further processing occurs and operation returns to block 504 in FIG. 5A to determine whether an exit condition exists.

If enough samples have been collected in block 537, the virtual machine sorts the differences array (block 538). A determination is made as to whether there are a sufficient number of values in the differences array (block 539). In one preferred embodiment, the limit may be three. However, the minimum number of values for determining a striding pattern may be varied depending upon the implementation. By recording the differences and sorting them in the differences array, the mechanism of the present invention focuses on relative memory accesses, rather than their absolute values. For example, an example pattern of memory accesses may include the following:

0×100
0×5100
0×100
0×f100
0×14100

The mechanism of the present invention would not get distracted by the distance between the first and fifth access, but would determine that one access is typically followed by another 0×5000 bytes away. If the cache line size were 1024 bytes, the differences array would hold the values [20, 20, 20, 20, . . . ]. Note that the first reference would be zero and, thus, not entered.

If there are fewer than three values in the differences array, then there are no sequences and the virtual machine recovers the data gathering structure (block 540) and places the load instruction in normal mode (block 541). Thereafter, operation returns to block 504 in FIG. 5A to determine whether an exit condition exists.

If there are at least three entries in the differences array, the virtual machine computes the sample standard deviation (S) in the sequence (block 542). Ideally, S will be zero; however, the mechanism of the present invention may tolerate some non-zero value. A determination is made as to whether S is greater than some value X (block 543). In one exemplary embodiment, X is set to one third the mean (average) of the differences, although the value of X may be changed depending upon the implementation. If the value of S is greater than X, the instruction is placed in normal mode (block 544). No information is forwarded to the JIT. Then, the data gathering structure is recovered (block 545) and operation returns to block 504 in FIG. 5A to determine whether an exit condition exists.

If S is not greater than X in block 543, then the virtual machine computes a putative constant difference between successive accesses (B) (block 546). The value of B is computed as follows:

$$B = \frac{\left(\left(\sum (\text{differences}[i-1])*\sum(i^2)\right) - \frac{(N*(N+1)/2)*\sum(i*\text{differences}[i-1])}{((N*\sum(i^2))-(N*(N+1)/2)^2)}\right)}{}$$

Where all of the sums are for i=1 to N, which is the length of the sequence determined above. The value of B represents the putative difference between successive accesses to the given field (the expected cache stride) in terms of cache lines. An appropriate data validation structure is provisioned for the instruction and the value B is copied to it (block 547). Then, the data gathering structure is recovered (block 548) and the load instruction is placed in validation mode (block 549). Thereafter, operation returns to block 504 in FIG. 5A to determine whether an exit condition exists.

Figure 5E:
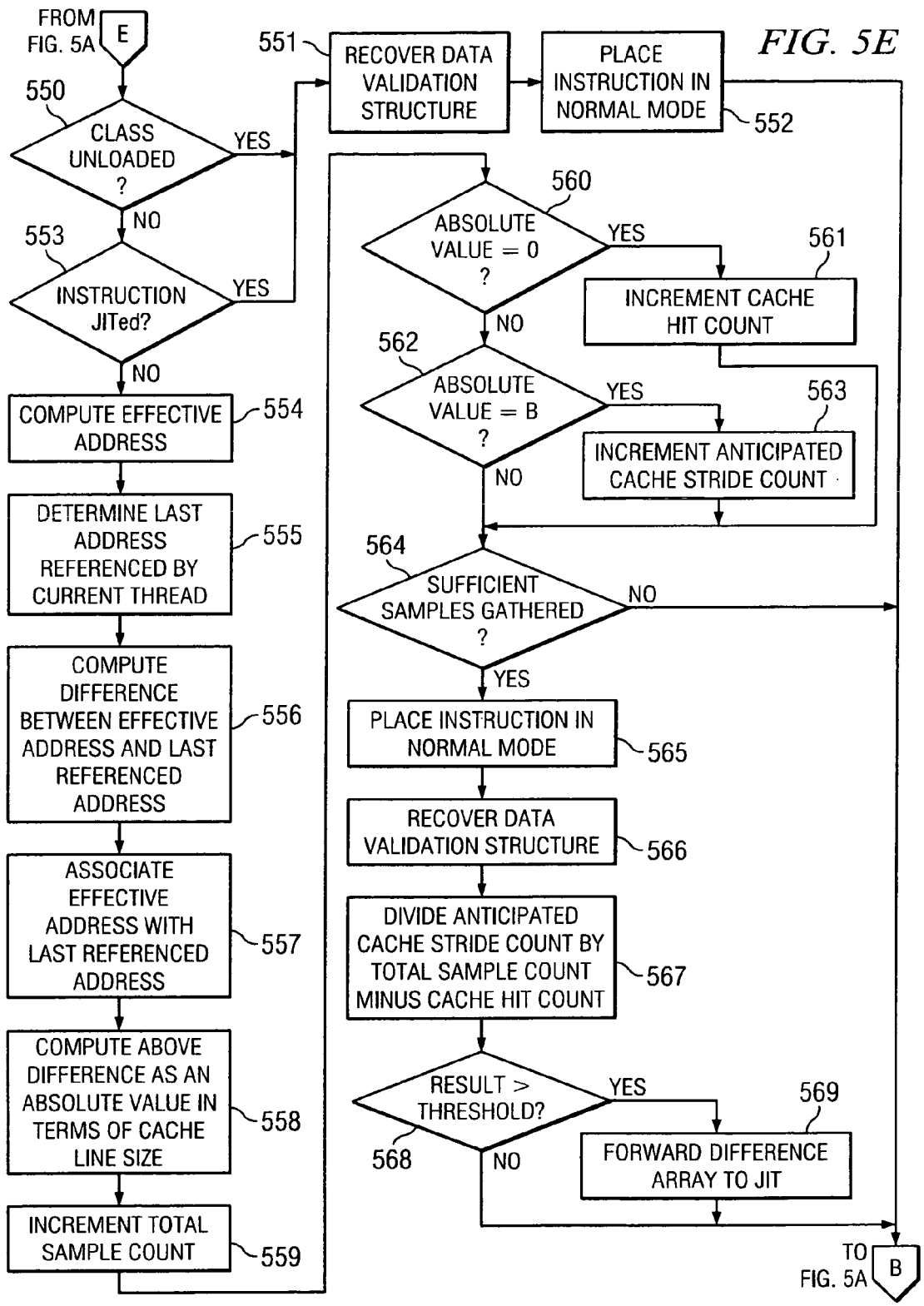

Returning to FIG. 5A, if a load instruction in validation mode is encountered in block 507, operation proceeds to block 550 in FIG. 5E where a determination is made as to whether the class is unloaded. If the class is unloaded, then the class is no longer being used and a determination of cache prefetching patters will not be of use; therefore, the data validation structure for the instruction is recovered (block 551) and the instruction is placed in normal mode (block 552). Thereafter, operation returns to block 504 in FIG. 5A to determine whether an exit condition exists.

If the class is not unloaded in block 550, a determination is made as to whether the instruction is just-in-time (JIT) compiled (block 553). If the instruction is compiled, then it is too late to provide cache prefetch pattern information to the JIT compiler; therefore, the data validation structure for the instruction is recovered (block 551) and the instruction is placed in normal mode (block 552). Thereafter, operation returns to block 504 in FIG. 5A to determine whether an exit condition exists.

If the instruction is not JIT compiled in block 553, the effective address is computed (block 554) and the last address referenced by the current thread is determined (block 555). Then, the difference between the effective address and the last referenced address is computed (block 556). The effective address is associated with the last referenced address (block 557). Next, an absolute value of the above difference in terms of cache line size is computed (block 558). Note that B is rounded up to the nearest whole number.

Next, the total sample count is incremented (block 559) and a determination is made as to whether the absolute value computed above is zero (block 560). If the absolute value is zero, then there is a direct cache hit. The cache hit count is incremented (block 561) and operation continues to block 564. If the absolute value is not zero in block 560, then a determination is made as to whether the absolute value is B (block 562). If the absolute value is B, then the anticipated cache stride is correct, in which case the anticipated cache stride count is incremented (block 563) and operation continues to block 564. If the absolute value is not B in block 562, then no counter is incremented and operation continues directly to block 564.

In block 564, a determination is made as to whether a sufficient number of samples have been gathered (block 564). This determination may be made, for example, by comparing the total sample count to a predetermined sample limit. In the example shown in FIG. 4B, the total sample limit is set to fifty; however, this value may be tuned to the particular program or instruction. If a sufficient number of samples have not been gathered, operation returns to block 504 in FIG. 5A to determine whether an exit condition exists.

If a sufficient number of samples have been gathered in block 564, the instruction is placed in normal mode (block 565) and the data validation structure is recovered (block 566). Then, the anticipated cache stride count is divided by the total sample count minus the cache hit count (block 567). The number of cache hits is subtracted, because direct cache hits do not count towards determining prefetching patterns. Thus, the anticipated cache stride count is divided by the total number of non-hit samples to form a percentage. This percentage is compared to a threshold (block 568). The threshold may preferably be 75%, for example. However, this value may be tuned depending upon the implementation. For example, 70% or any other value may be used depending upon the accuracy desired.

If the percentage is not greater than the threshold, then the cache prefetch information is ignored and operation returns to block 504 in FIG. 5A to determine whether an exit condition exists. If the result is greater than the threshold in block 568, then the difference array is forwarded to the JIT compiler (block 569) and operation returns to block 504 in FIG. 5A to determine whether an exit condition exists.

Thus, the present invention solves the disadvantages of the prior art by providing a mechanism that identifies instructions that access storage and may be candidates for catch prefetching. The mechanism augments these instructions so that any given instance of the instruction operates in one of four modes, namely normal, unexecuted, data gathering, and validation. In the normal mode, the instruction merely performs the function specified in the software runtime environment. An instruction in unexecuted mode, upon the next execution, is placed in data gathering mode. When an instruction in the data gathering mode is encountered, the mechanism of the present invention collects data to discover potential fixed storage access patterns. When an instruction is in validation mode, the mechanism of the present invention validates the presumed fixed storage access patterns.

The mechanism of the present invention presents a much cheaper and possibly more accurate solution for obtaining stride patterns for use by a JIT compiler when generating binary code. Because the mechanism of the present invention records the relationship of actual memory access patterns regardless of data structure, it is beneficial to any type of data structure. The mechanism of the present invention is focused on architectures containing processor-specific data caches; however, multiprocessors sharing caches could also benefit from the mechanism of the present invention.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMS, DVD-ROMS, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for determining cache prefetching patterns, the method comprising:
    identifying an instruction as a candidate for cache prefetching;
    placing the instruction in data gathering mode;
    upon executing the instruction in data gathering mode, recording, in an array of address differences, a difference between a current address being referenced and a last address being referenced, wherein the difference is determined using a cache line size; and
    responsive to a number of address differences being recorded in the array of address differences exceeding a threshold, determining an expected cache stride value based on the array of address differences, wherein the expected cache stride value is determined using the following equation:

$$B = \frac{\left(\left(\sum (\text{differences}[i-1]) * \sum (i^2)\right) - (N*(N+1)/2) * \sum (i*\text{differences}[i-1])\right)}{((N*\sum(i^2)) - (N*(N+1)/2)^2)}$$

wherein B represents an expected cache stride in terms of cache lines and wherein all sums are for i=1 to N, wherein N is the number of address differences in the array of address differences.

2. The method of claim 1, wherein placing the instruction in data gathering mode includes:
    provisioning a data gathering structure for the instruction, wherein the array of address differences is stored in the data gathering structure.

3. The method of claim 2, further comprising:
    responsive to a class containing the instruction being unloaded, recovering the data gathering structure.

4. The method of claim 2, further comprising:
    responsive to identifying the instruction as the candidate for cache prefetching, placing the instruction in unexecuted mode.

5. The method of claim 4, wherein the step of placing the instruction in data gathering mode is performed upon executing the instruction in unexecuted mode.

6. The method of claim 4, wherein the step of provisioning the data gathering structure for the instruction is performed upon executing the instruction in unexecuted mode.

7. The method of claim 1, further comprising:
    responsive to the number of address differences being recorded in the array of address differences exceeding the threshold, validating the expected cache stride value.

8. The method of claim 7, wherein validating the expected cache stride value includes:
    placing the instruction in a validation mode;
    upon executing the instruction in validation mode, performing the following steps:
    incrementing a total sample count;
    incrementing a cache hit count if the current address being referenced is within a same cache line as the last address being referenced;
    incrementing an anticipated cache stride count if the current address being referenced is within the expected cache stride value of the last address being referenced;
    determining whether a sufficient number of samples have been considered based on the total sample count; and
    responsive to the sufficient number of samples being considered, determining whether a predetermined percentage of accesses are within the expected cache stride value based on the total sample count, the cache hit count, and the anticipated cache stride count.

9. The method of claim 7, further comprising:
    responsive to the expected cache stride value being valid, providing the array of address differences to a compiler.

10. The method of claim 1, further comprising:
    responsive to the instruction being just-in-time compiled, placing the instruction in normal mode.

11. The method of claim 1, further comprising:
    responsive to the number of address differences being recorded in the array of address differences exceeding the threshold, determining a standard deviation for the address differences in the array of address differences; and
    responsive to the standard deviation exceeding a designated threshold, placing the instruction in normal mode.

12. The method of claim 1, wherein the recording further comprises:
    recording, in the array of address differences, the difference between the current address being referenced and the last address being referenced, wherein the difference is divided by the cache line size.

13. A computer program product, in a recordable-type computer readable medium, for determining cache prefetching patterns, the computer program product comprising:
    instructions for identifying an instruction as a candidate for cache prefetching;
    instructions for placing the instruction in data gathering mode;
    instructions, upon executing the instruction in data gathering mode, for recording, in an array of address differences, a difference between a current address being referenced and a last address being referenced, wherein the difference is determined using a cache line size; and
    instructions, responsive to a number of address differences being recorded in the array of address differences exceeding a threshold, for determining an expected cache stride value based on the array of address differences, wherein the expected cache stride value is determined using the following equation:

$$B = \frac{\left(\left(\sum (\text{differences}[i-1]) * \sum (i^2)\right) - (N*(N+1)/2) * \sum (i * \text{differences}[i-1])\right)}{\left((N * \sum (i^2)) - (N*(N+1)/2)^2\right)}$$

wherein B represents an expected cache stride in terms of cache lines and wherein all sums are for i=1 to N, wherein N is the number of address differences in the array of address differences.

14. The computer program product of claim 13, wherein placing the instruction in data gathering mode includes:
instructions for provisioning a data gathering structure for the instruction, wherein the array of address differences is stored in the data gathering structure.

15. The computer program product of claim 13, further comprising:
instructions, responsive to the number of address differences being recorded in the array of address differences exceeding the threshold, for validating the expected cache stride value.

16. The computer program product of claim 15, wherein the instructions for validating the expected cache stride value includes:
instructions for placing the instruction in a validation mode;
instructions, upon executing the instruction in validation mode, for performing the following steps:
incrementing a total sample count;
incrementing a cache hit count if the current address being referenced is within a same cache line as the last address being referenced;
incrementing an anticipated cache stride count if the current address being referenced is within the expected cache stride value of the last address being referenced;
determining whether a sufficient number of samples have been considered based on the total sample count; and
responsive to the sufficient number of samples being considered, determining whether a predetermined percentage of accesses are within the expected cache stride value based on the total sample count, the cache hit count, and the anticipated cache stride count.

17. The computer program product of claim 15, further comprising:
instructions, responsive to the expected cache stride value being valid, for providing the array of address differences to a compiler.

18. An apparatus for determining cache prefetching patterns, the apparatus comprising:
means for identifying an instruction as a candidate for cache prefetching;
means for placing the instruction in data gathering mode;
means for recording, upon executing the instruction in data gathering mode, in an array of address differences, a difference between a current address being referenced and a last address being referenced, wherein the difference is determined using a cache line size; and
responsive to a number of address differences being recorded in the array of address differences exceeding a threshold, determining an expected cache stride value based on the array of address differences, wherein the expected cache stride value is determined using the following equation:

$$B = \frac{\left(\left(\sum (\text{differences}[i-1]) * \sum (i^2)\right) - (N*(N+1)/2) * \sum (i * \text{differences}[i-1])\right)}{\left((N * \sum (i^2)) - (N*(N+1)/2)^2\right)}$$

wherein B represents an expected cache stride in terms of cache lines and wherein all sums are for i=1 to N, wherein N is the number of address differences in the array of address differences.

* * * * *